United States Patent
Odigie et al.

(10) Patent No.: US 8,359,060 B2
(45) Date of Patent: *Jan. 22, 2013

(54) APPARATUS, SYSTEM, AND METHOD FOR MANAGING TRANSMISSION POWER IN A WIRELESS COMMUNICATION SYSTEM

(75) Inventors: Erumusele O. Odigie, Mountain View, CA (US); Nitin Kasturi, Los Gatos, CA (US); Parvathanathan Subrahmanya, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/036,877

(22) Filed: Feb. 28, 2011

(65) Prior Publication Data

US 2011/0165907 A1    Jul. 7, 2011

Related U.S. Application Data

(63) Continuation of application No. 11/217,242, filed on Aug. 31, 2005, now Pat. No. 7,899,480.

(60) Provisional application No. 60/608,826, filed on Sep. 9, 2004.

(51) Int. Cl.
    *H04B 7/00* (2006.01)
(52) U.S. Cl. ............................ 455/522; 455/69; 370/318
(58) Field of Classification Search .................. 455/522, 455/69; 370/318
    See application file for complete search history.

(56) References Cited

U.S. PATENT DOCUMENTS

| | | | |
|---|---|---|---|
| 7,062,288 B2* | 6/2006 | Raaf et al. ..................... | 455/522 |
| 7,082,108 B2 | 7/2006 | Hwang et al. | |
| 7,660,277 B2 | 2/2010 | Pi et al. | |
| 7,899,480 B2* | 3/2011 | Odigie et al. ................. | 455/522 |
| 2002/0196766 A1* | 12/2002 | Hwang et al. ................. | 370/342 |
| 2003/0036403 A1 | 2/2003 | Shiu et al. | |
| 2004/0110477 A1 | 6/2004 | Nishimura et al. | |
| 2005/0113106 A1* | 5/2005 | Duan et al. ................... | 455/452.2 |
| 2005/0147063 A1* | 7/2005 | Pi et al. ........................ | 370/335 |

FOREIGN PATENT DOCUMENTS

| | | |
|---|---|---|
| EP | 1119113 A2 | 7/2001 |
| JP | 11074835 A | 3/1999 |
| JP | 2001308723 | 11/2001 |
| JP | 2003510950 A | 3/2003 |
| JP | 2003338762 | 11/2003 |
| JP | 2005039511 A | 2/2005 |
| KR | 200052870 | 8/2000 |
| KR | 200242740 | 5/2002 |

OTHER PUBLICATIONS

International search report—PCT/US2005/032482—International Search Authority—European Patent Office—Jan. 23, 2006.
Written Opinion—PCT/US2005/032482, International Search Authority, European Patent Office, Jan. 23, 2006.
Taiwan Search Report—TW094131238—TIPO—Sep. 6, 2011.

\* cited by examiner

*Primary Examiner* — Nay A Maung
*Assistant Examiner* — Angelica M Perez

(57) ABSTRACT

An apparatus, system, and method efficiently manage transmission power in a user equipment (UE) device by maintaining and applying an authorized power level to determine a transmission power level after a power limited transmission and before a new power control command has been received. The UE device maintains the authorized power level by monitoring and adjusting the authorized power level based on received power control commands. After a power limited transmission where the maximum power level is less than the authorized power level, the UE device determines the transmission power level for the next transmission based on the authorized power level. Accordingly, after the power limiting situation has ceased, the UE device transmits at the optimum power level eliminating the inefficiencies of transmitting at a lower than authorized power before the next power control command is received.

36 Claims, 6 Drawing Sheets

APPARATUS, SYSTEM, AND METHOD FOR MANAGING TRANSMISSION POWER IN A WIRELESS COMMUNICATION SYSTEM

CROSS REFERENCE TO RELATED APPLICATIONS

This application is a continuation of U.S. patent application Ser. No. 11/217,242, filed on Aug. 31, 2005, entitled APPARATUS, SYSTEM, AND METHOD FOR MANAGING TRANSMISSION POWER IN A WIRELESS COMMUNICATION SYSTEM, granted on Mar. 1, 2011 as U.S. Pat. No. 7,899,480, which claims the benefit of priority of U.S. Provisional Application Ser. No. 60/608,826, filed on Sep. 9, 2004, entitled METHOD AND APPARATUS FOR POWER CONTROL IN WIRELESS COMMUNICATIONS, both assigned to the assignee hereof and incorporated by reference herein.

BACKGROUND

The invention relates in general to communication systems and more specifically to an apparatus, system, and method for managing transmission power in a wireless communication system.

Wireless communication systems typically employ power control procedures to maximize the overall performance of the communication system. Power control procedures are particularly advantageous in systems utilizing code division multiple assess (CDMA) techniques since the signals transmitted from user equipment other than the target transmission source appear as noise to the receiver. Accordingly, system performance is improved if the transmission powers of the user equipment are properly managed. In conventional wireless communication systems such as cellular and Universal Mobile Telecommunications Service (UMTS) systems, a base station (node B) periodically transmits power control information to mobile stations (user equipment) indicating whether a mobile station should increase or decrease transmission power. Typically, a base station is referred to as a Node B and mobile stations are referred to as user equipment (UE) in UMTS systems. In addition to the power control commands, the actual transmission power of a UE device depends on the number of channels that are transmitted, the amount of data that is transmitted, and the maximum transmission power of the UE device.

Conventional systems are limited in that transmission power levels determined for a particular set of conditions are not adjusted when the conditions change unless power control commands are received indicating that the power should be changed. Since the power control information is only received periodically, situations arise where a UE device is transmitting data at less than an optimum power level until new power control information is received. In conventional systems, for example, if a UE device is limited by a maximum power limit to transmit at a lower power than authorized by a node B, the UE device scales the transmission power levels of the channels to maintain relative powers between the channels without exceeding the maximum power limit. When the data rate or the number of channels is reduced, the transmission power level remains below the authorized level until new power control information is received. Therefore, the transmission power level of a UE device in a conventional system remains at less than optimum level after a power limited transmission and before a new power control command is received.

Accordingly, there is a need for an apparatus, system, and method for managing transmission power in a wireless communication system.

SUMMARY

One embodiment is an user equipment (UE) device that manages transmission power by maintaining an authorized power level based on received power control commands and determining, after power limited transmission and before a new power control command has been received, a transmission power level for a signal based on the authorized power level. After the power limited transmission where the maximum power level is less than the authorized power level, the UE device determines the transmission power level for the next transmission based on the authorized power level.

Another embodiment is a program product for managing transmission power in a user equipment device, a distributed computer system, the program product comprising computer-executable instructions contained on a computer-readable medium and configured for causing the following computer-executed steps to occur: maintaining an authorized power level based on received power control commands; determining, after power limited transmission and before a new power control command has been received, a transmission power level for a signal based on the authorized power level.

Yet another embodiment is a user equipment device configured to communicate in a wireless communication system, the user equipment device comprising: a maintaining means for maintaining an authorized power level based on received power control commands; a determining means for determining, after power limited transmission and before a new power control command has been received, a transmission power level for a signal based on the authorized power level.

DETAILED DESCRIPTION

An apparatus, system, and method efficiently manage transmission power in a user equipment (UE) device by maintaining and applying an authorized power level to determine a transmission power level after a power limited transmission and before a new power control command has been received. The UE device maintains the authorized power level by monitoring and adjusting the authorized power level based on received power control commands, transmission data rates, and channel configuration changes. After a power limited transmission where the maximum power level is less than the authorized power level, the UE device determines the transmission power level for the next transmission based on the authorized power level. Accordingly, after the power limiting situation has ceased, the UE device transmits at the optimum power level eliminating the inefficiencies of transmitting at a lower than authorized power before the next power control command is received.

Figure 1:
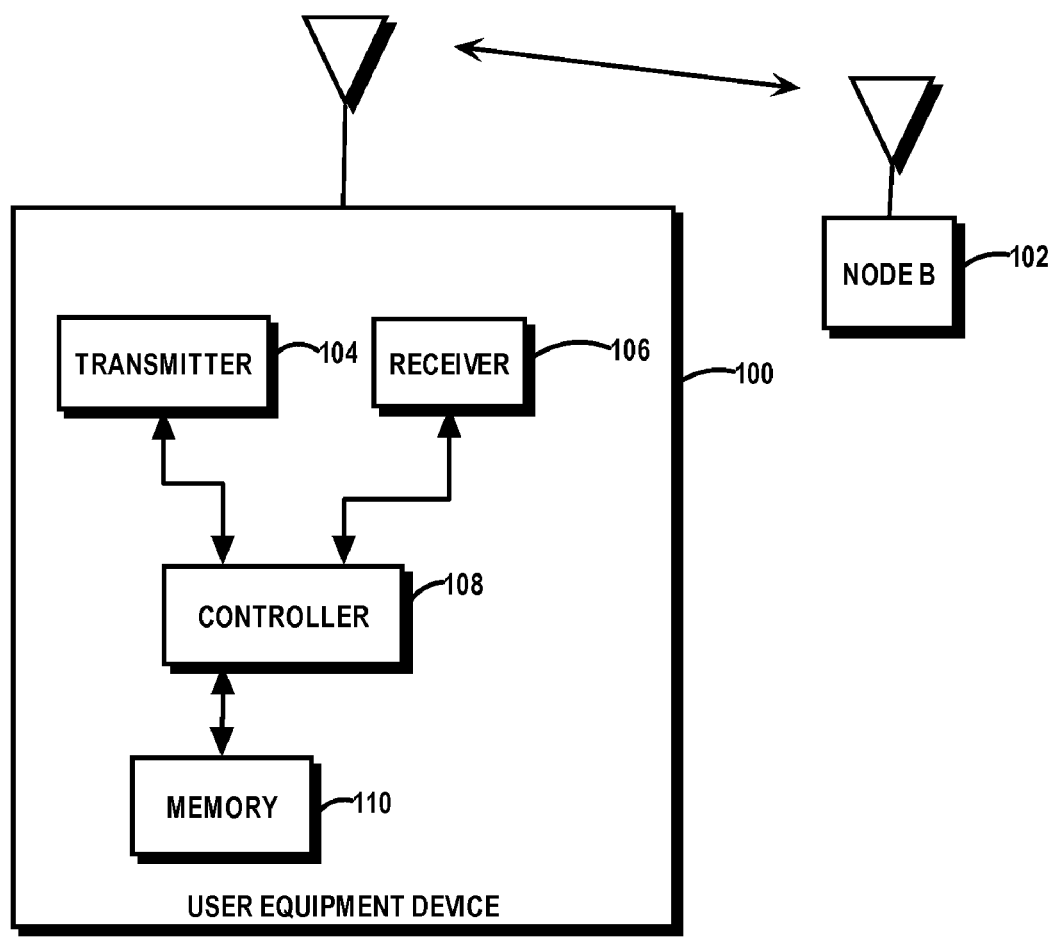
FIG. 1 is a block diagram of a user equipment (UE) device in accordance with an exemplary embodiment of the invention.

FIG. 1 is a block diagram of a user equipment (UE) device 100 communicating with a node B 102 of a wireless communication system in accordance with the exemplary embodiment of the invention. The various functional blocks depicted in FIG. 1 may be performed by any combination of hardware, software and/or firmware. Any function described as performed by a single block may be performed by multiple devices or systems and the functions of more than one block may be performed by a single device in some circumstances. For example, the controller 108 may perform receiver and transmitter functions in some circumstances.

In the exemplary embodiment, a UE device 100 communicates with one or more node Bs 102 in accordance with UMTS standards. The transmission power management techniques discussed herein may be used in any of numerous communication systems. The UE device 100 may be a mobile station, mobile unit, cellular telephone, wireless PDA or any other portable communication device. Further, those skilled in the art will recognize that the node B is a base station in a UMTS system and that the functions of the node B may be applied to any type of base station or BTS utilizing power control in a communication system.

A controller 108 in the UE device 100 controls a transmitter 104 and receiver 106 as well as performing other functions including managing the overall functionality of the UE device 100. The controller 108 is any combination of processors, microprocessors, processor arrangements, computers, logical gates, application specific integrated circuits (ASICs), programmable logic circuits, and/or computing circuits. Software running on the controller 108 performs the functions described herein as well as calculations and other device management and communication tasks.

During operation, the receiver 106 receives power control signals from the node B 102. In the exemplary embodiment, the power control signals are transmit power control (TCP) signals that indicate whether the UE device 100 should increase or decrease the transmission power relative to the last UE transmission. As is known, the power control information in a UMTS system indicates an authorized transmission power level (PAU) that, when applied to a transmission data rate of a signal, indicates the total authorized transmission power for the signal. The UE device 100 determines the appropriate transmission power level based on the total amount of data that is to be transmitted. The total transmission power is increased as the data rate increases. Accordingly, if a transmission channel is added, the UE device 100 is authorized to transmit at a higher power level than without the additional channel when all other factors remain constant. The authorized power level (PAU) is sometimes referred to as desired power.

The actual transmission power (PTRANS) of a signal transmitted from the UE device 100, however, conforms to other constraints in addition to the power control commands. The transmission power level of a signal must be greater than or equal to a minimum power level (PMIN) and less than or equal to a maximum power level (PMAX) (e.g. PMIN≦PTRANS≦PMAX). The maximum power is typically the lesser of the power level specified by the parameters of the class of the UE device 100 a power ceiling established and conveyed by the network. The network establishes the power ceiling by optimizing communication capacity for every UE device services by the particular cell. The minimum power is typically determined by the particular communication standard although the minimum power may vary between UE devices 100. An example of a minimum power level required by a communication standard is −50 dBm. As discussed above, ambiguities and inefficiencies can occur in conventional systems when the power control commands instruct the UE device 100 to transmit outside of these limits. Specifically, if the power control indicates that the UE device 100 should transmit at an authorized power level greater than the maximum power level, the UE device 100 limits the transmission power for some transmission data rates or scales the transmission power level of the channels in order to adhere to the maximum power limit. When the power limited situation ceases, such as when the transmission data rate for the next UE transmission decreases or the additional channel is no longer in use, the conventional UE device determines the power level based on the scaled power and transmits at a power level less than the power authorized by the node B 102. The conventional UE device continues to transmit at a lower than optimum transmission power level until the node B 102 adjusts the transmission power using power control commands.

In accordance with the exemplary embodiment, the UE device 100 maintains an authorized power level by monitoring and adjusting the authorized power level in accordance with the power control commands. After transmission power is limited by the maximum power, the UE device 100 applies the authorized power level to determine the transmission power of the next transmission. The UE device 100, therefore, tracks the authorized power level and does not continue to limit the transmission power in accordance with the power limited transmission as in conventional systems. The transmission power of the non-limited signal transmitted after the power limited situation ceases does not depend on the previous power limited transmission of the power limited signal.

A value representing the authorized power level is stored in memory 110 which may include any combination of volatile or non-volatile memory devices. The memory may include random assess memory (RAM) devices, for example. Software running on the controller 108 applies the criteria to maintain the authorized transmission power level which is stored as a value in the memory 110 in the exemplary embodiment.

Therefore, the controller 108 is configured to maintain the authorized power level related to the transmission data rate and based on the power control commands. The controller 108 is further configured to determine, after a power limited state has ceased and before a new power control command has been received, the transmission power level for the signal based on the authorized power level. The receiver 106 is configured to receive power control commands and the transmitter 104 is configured to transmit the power limited signal and then transmit the non-limited signal at the authorized power level after the power limited situation has ceased.

The methods and apparatus of this invention may take the form, at least partially, of program logic or program code (i.e., instructions) embodied in tangible media, such as floppy diskettes, CD-ROMs, hard drives, random access or read only-memory, or any other machine-readable storage medium. When the program code is loaded into and executed by a machine, such as a computer or processor within a UE device 100, the machine becomes an apparatus for practicing the invention. The methods and apparatus of the present invention may also be embodied in the form of program code that is transmitted over some transmission medium, such as over electrical wiring or cabling, through fiber optics, a radio frequency link, or via any other form of transmission. When the program code is received and loaded into and executed by a machine, such as a computer, processor or controller 108 within the UE device 100, the machine becomes an apparatus for practicing the invention. When implemented on a general-purpose processor, the program code combines with the processor to provide a unique apparatus that operates analogously to specific logic circuits.

Figure 2:
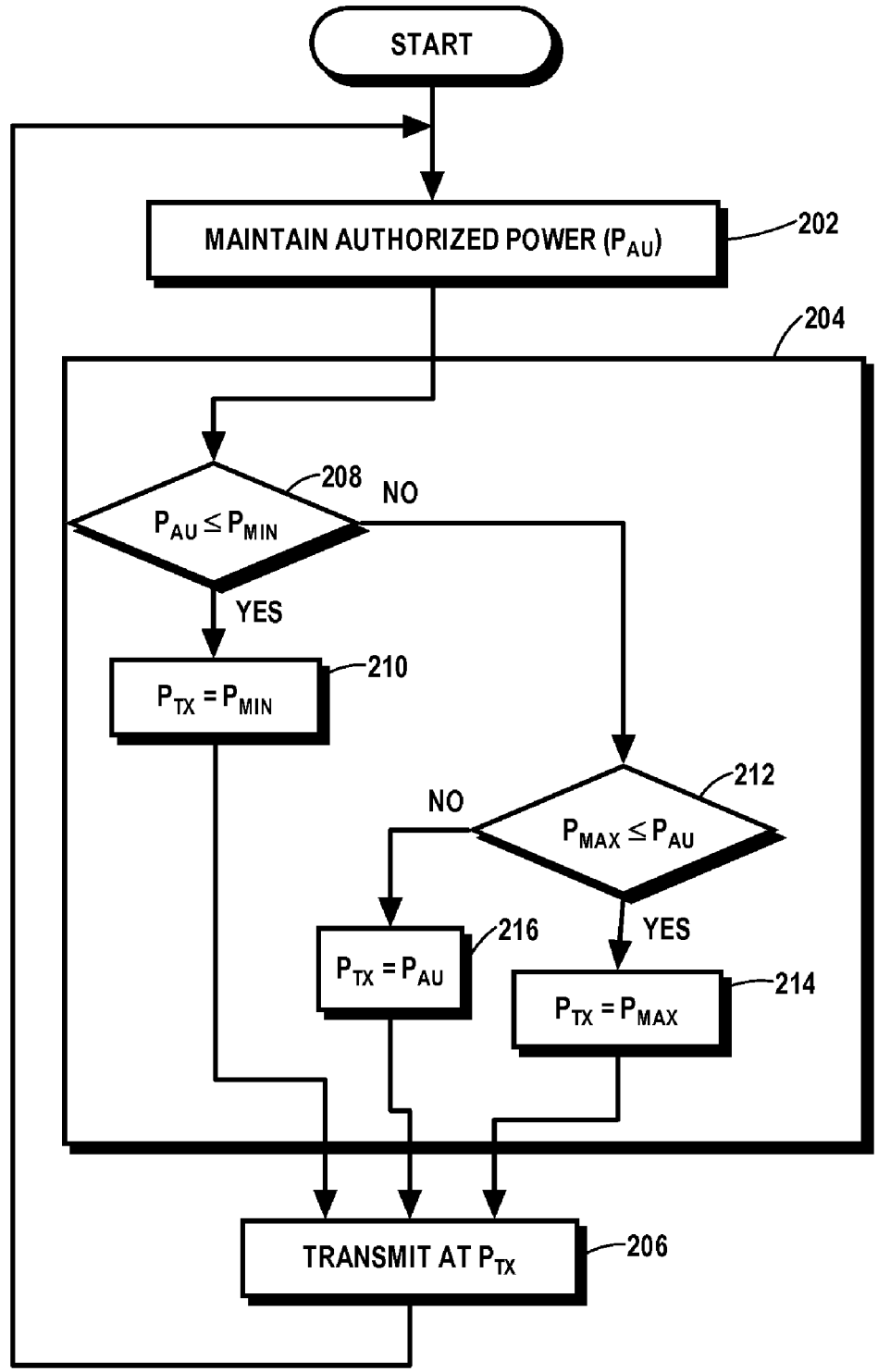
FIG. 2 is a flow chart of a method of managing transmission power in a UE device in accordance with the exemplary embodiment of the invention.

FIG. 2 is a flow chart of a method of transmission power management in the UE device 100 in accordance with the exemplary embodiment of the invention. The method may be performed by any combination of hardware, firmware and/or software. In the exemplary embodiment, the method is performed by software code running on the controller 108 utilizing the memory 110, transmitter 104, receiver 106 and other devices in the UE device 100. In some circumstances, the order of the steps described with reference to FIG. 2 and FIG. 3 may vary.

At step 202, the authorized power level is maintained at the UE device 100. The controller 108 interprets power control commands transmitted by the node B 102 and received through the receiver 106 to adjust the authorized power level. In the exemplary embodiment, TPC commands in accordance with the UMTS standard are received by the receiver 106 and indicate if the authorized power should be increased or decreased. A value representing the authorized power level is stored in memory and updated as necessary. The UE device 100, therefore, monitors and adjusts the authorized power level based on the power control commands. An exemplary method of performing step 202 is discussed in further detail with reference to FIG. 3 below.

At step 204, the transmission power level for a signal is determined based on the authorized power level. In addition to the criteria discussed immediately below and the selected data rate of the signal to be transmitted, other rules and criteria may apply in determining the authorized power level for the signal in some circumstances. Step 204 includes steps 208 through 214.

At step 206, a signal is transmitted from the UE device 100 at a transmission power (PTX). In the exemplary embodiment, the transmission power (PTX) is determined based on the transmission data rate and the number of channels in accordance with a transmission scheme as well as the criteria used in steps 208-214. In the exemplary embodiment, therefore, power management method applies the authorized power level to transmit a non-limited signal after a power limited signal is transmitted and before a new power control command is received. After the signal is transmitted, the procedure returns to step 202.

Steps 208 through 216 provide an exemplary method of performing step 204. At step 208, it is determined whether the authorized power level is less than or equal to the minimum power level (PMIN) of the UE device 100. If the authorized power is less than or equal to the minimum power level (PMIN), the transmission power (PTX) is set equal to the minimum power at step 210 before the procedure continues at step 206. Otherwise, the procedure continues at step 212.

At step 212, it is determined whether the maximum power is less than or equal to the authorized power level (PAU). If the maximum power is less than or equal to the authorized power level, the transmission power level is set equal to the maximum power level at step 214 before the procedure continues at step 206. Otherwise, the transmission power is set equal to the authorized power at step 216 before procedure continues at step 206.

Figure 3:
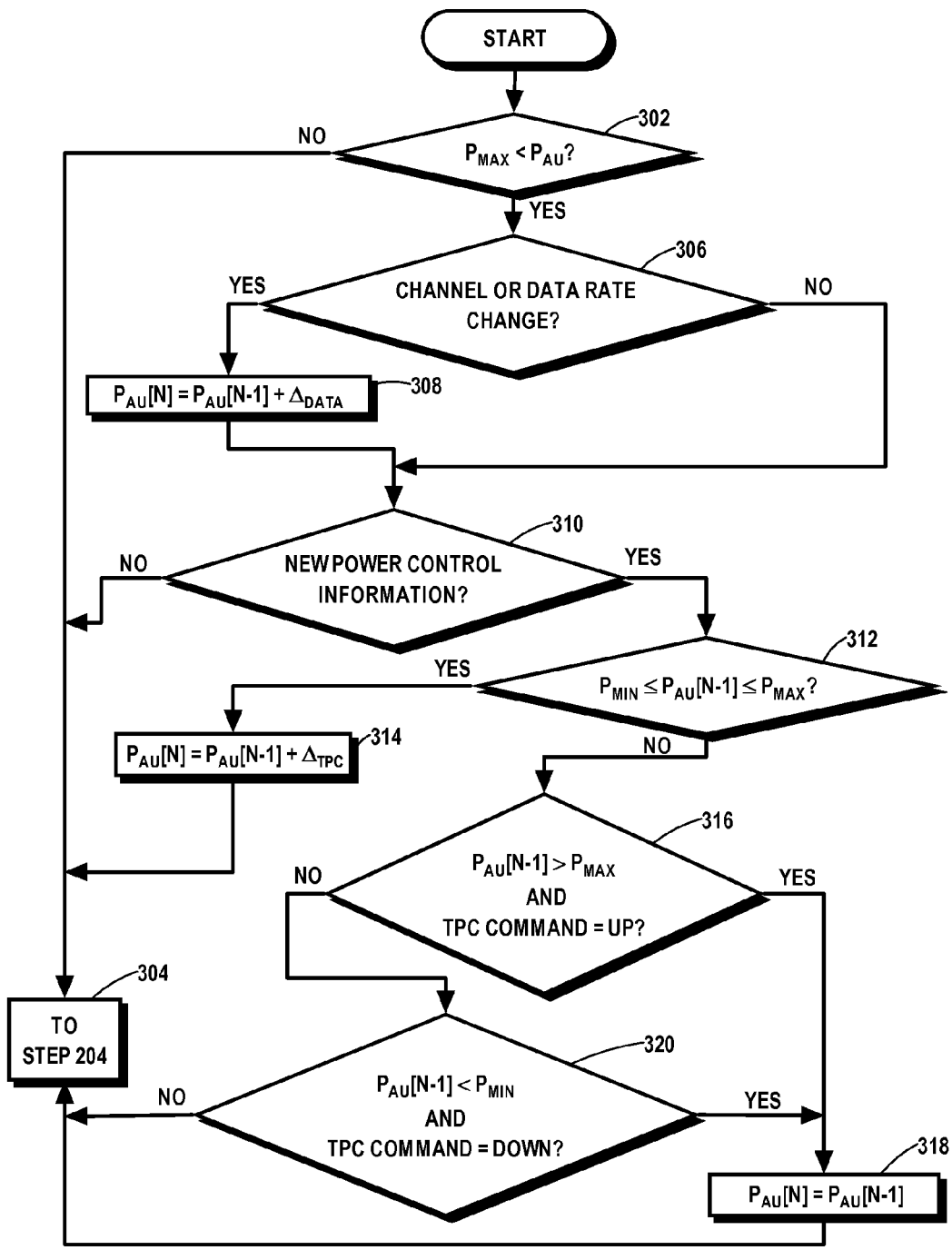
FIG. 3 is a flow chart of maintaining the authorized power level in accordance with the exemplary embodiment of the invention.

FIG. 3 is a flow chart of maintaining the authorized power level in accordance with the exemplary embodiment of the invention. Steps 302 through 320 provide an exemplary method for performing step 202 of FIG. 2. The method may be performed by any combination of hardware, firmware and/or software. In the exemplary embodiment, the method is performed by executing software code on the controller 108 utilizing the memory 110, transmitter 104, receiver 106 and other devices in the UE device 100.

At step 302, it is determined whether the maximum power level is less than the authorized power level. If the maximum power level is not less than the authorized power level, the procedure continues to step 304 where the procedure is returned to step 204. Otherwise, the procedure continues at step 306.

At step 306, it is determined whether a data rate change or a channel change has occurred since the last transmission. In the exemplary embodiment, a data rate change is indicated by a change in the Transport Format Combination indicator (TFCI) sent in the Uplink transmission in accordance with the UMTS standard. A change in the physical channel combination is detected by time aligning the different uplink Physical channels such as DPDCH and HSDPCCH and determining when either of them is turned on, turned off, or has a change in expected transmit power. If no change has occurred, the procedure continues at step 310. Otherwise, the procedure continues to step 308.

At step 308, the previous authorized power level (PAU[N−1]) is adjusted to produce a current authorized power level (PAU[N]) based on the channel change or data change. When a data rate change has occurred in the exemplary embodiment, the current authorized power is the previous authorized power plus a delta power in dB, where the delta power is calculated by comparing the DPDCH and DPCCH power scaling factors of the new TFCI[N] with that of the previous TFCI[N−1], subject to the constraint that the power on the DPCCH is the same for the transmission of TFCI[N−1] and TFCI[N].

At step 310, it is determined whether new power control information has been received since the last transmission. If no new power control information have been received the procedure returns to step 204. Otherwise, the procedure continues at step 312.

At step 312, it is determined whether the previous authorized power level is between the maximum and minimum limits (PMIN PAU[N−1] PMAX). In the exemplary embodiment, the maximum and minimum power limits are known a priori and depend on the UE category and network signaled values. These parameters are configured in the UE during the initial handshaking operation between the UE and the Node B. If the previous authorized power limit is between the power limits, the procedure continues at step 314. Otherwise, the procedure continues at step 316.

At step 314, the new power control commands are applied to adjust the authorized power level and to produce the current authorized power level before proceeding to step 204.

At step 316, it is determined whether the previous authorized power level is greater than the maximum authorized power and a TPC command is equal to "UP". If the condition is met, the current authorized power level is set equal to the previous authorized power level and the procedure continues at step 304. Otherwise, the procedure continues at step 320.

At step 320 it is determined whether the previous authorized power level is less than the minimum authorized power and a TPC command is equal to "DOWN". If the condition is met, the current authorized power level is set equal to the previous authorized power level and the procedure continues at step 204. Otherwise, the procedure continues at step 204.

As the exemplary steps described with reference to FIG. 2 and FIG. 3 are continuously performed in the exemplary embodiment, situations where a power limited transmission is followed by a non-limited signal are managed by transmitting the non-limited signal at the authorized power level.

Figure 4:
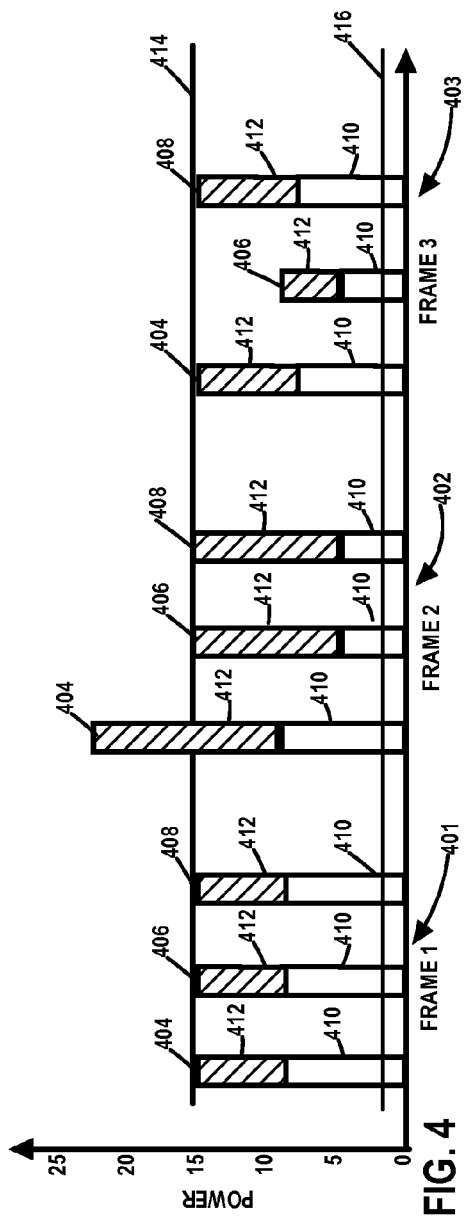
FIG. 4 is a graph illustrating a comparison of transmission power levels for conventional system and the exemplary UE device in accordance with a first example.

FIG. 4 is a graphical illustration of a comparison of transmission power levels for a conventional system and for the exemplary UE device in accordance with a first example. The graphical illustration includes representations of an authorized transmission power 404, a conventional transmission power 406, and a UE device transmission power 408 for three frames 401, 402, 403 in a first transmission example. Such a scenario is feasible when there is voice coded data (AMR-Adaptive Multi Rate) being transmitted in frames 1, 2 and 3 (401, 402, 403). If as shown in FIG. 4 there is an additional signaling message transmitted on the DPDCH in Frame 2 only, Frame 3 shows how quickly the system can return to the steady state power levels of Frame 1 using the adaptive authorized power implementation in accordance with the exemplary embodiment. Thus the increase in error rate of the voice traffic due to limited transmission power will be limited to Frame 2 only. While without adaptive authorized power implementation, the error rate will be increased for a much longer time including Frame 2, Frame 3 and until power control commands force the power up. This is particularly not desirable because of the implicit high symbol detection errors in communicating power control commands.

Each transmission power representation 404, 406, 408 includes a DPCCH portion 410 and a DPDCH portion 412. The maximum power 414 for the UE device is represented by a horizontal line at a power value of 15 and the minimum power level 416 is depicted as horizontal line at 1. In the first frame 401, the authorized power level 404, the conventional transmission power level 406 and the UE transmission power level 408 are the same near the maximum power level 414. For the first example, the TFCI #0 (BetaC=BetaD=15) providing a total transmission power 404, 406, 408 in the first frame 401 of PMAX-0.3 dB. At the second frame 402, the authorized power is greater than the maximum. TFCI #1 (BetaC=7, BetaD=15) in the second frame 402. The data rate is therefore greater in the second frame 402 than in the first frame 401 resulting in a higher authorized power of 4.46 dB more than in the first frame 401. The conventional transmission power 406 and the UE device transmission power 408 are both limited to the maximum power 414 and the DPCCH portion 410 and DPDCH portion 412 are reduced to conform to the power limit 414. At the third frame 403 in the first example, the UE device is transmitting again at TFCI #0. The conventional power 406 in the third frame 403 is lower than the maximum power 414 even though the authorized power 404 allows for transmission at a higher level. The power control in the conventional system was forcefully adjusted in the second frame 402 and no correction was applied in the third frame 403. Accordingly, the conventional transmission power 406 in the third frame 403 is based on the transmission 406 in the previous frame 402 and not on the authorized power 404. The transmission power level 408 of the exemplary UE device, however, returns to the authorized power level 404.

Figure 5:
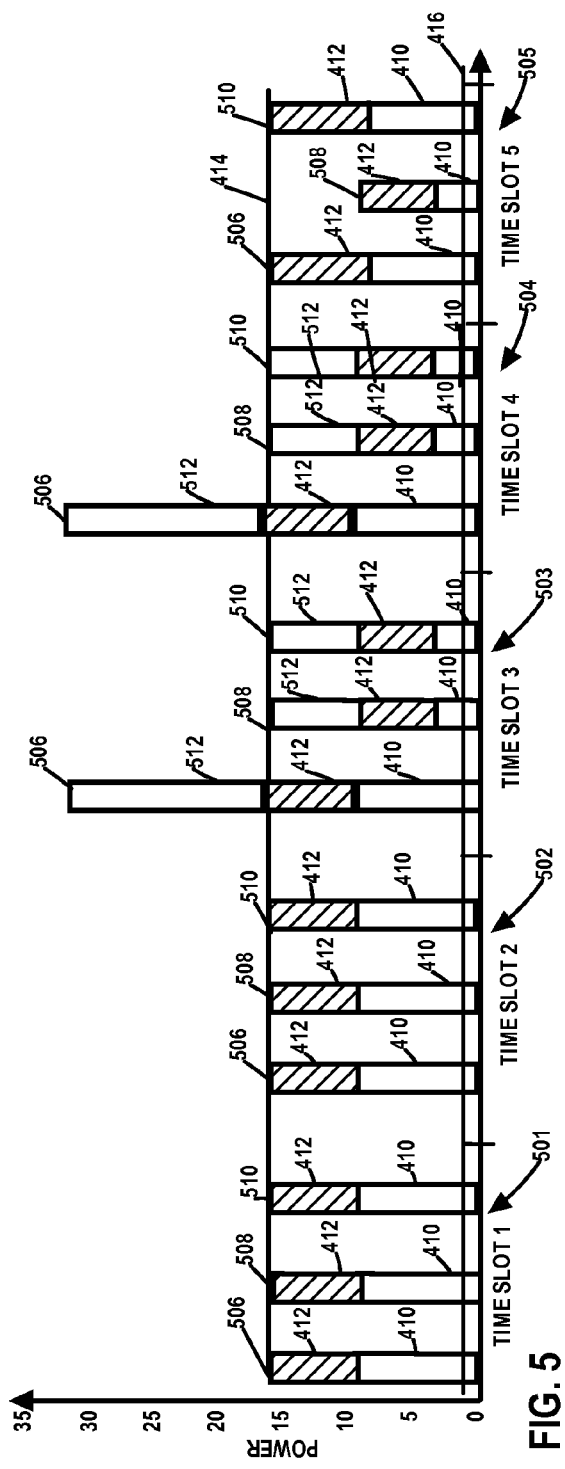
FIG. 5 is a graph illustrating a comparison of transmission power levels for a conventional system and the exemplary UE device in accordance with a second example.

FIG. 5 is a graphical illustration of a comparison of transmission power levels 508, 510 for a conventional system and the exemplary UE device in accordance with a second example. The graphical illustration includes representations of an authorized transmission power 506, a conventional transmission power 508, and a UE device transmission power 510 for five time slots 501, 502, 503, 504, 505 in a second transmission example.

In the first time slot 501 and the second time slot 502, the transmission signals include only a DPDCH portion 412 and a DPCCH portion 410. In the third time slot 503 and the fourth time slot 504, the addition of the HSDPCCH channel results in a HSDPCCH portion 512 and an authorized power level 506 that is greater than the maximum power level 414 for the UE device. The power of each portion 410, 412, 512 is reduced in order to maintain a transmission power level less than the maximum power level 414. In the fifth time slot 505, the HSDPCCH channel is not used and the authorized power level 506 returns to a value less than the maximum power level 414. The conventional transmission power 508 is less than the authorized power level 506 since no adjustment is made after the scaling of the channel powers 410, 412, 512 in the third time slot 503 and fourth time slot 504. The UE device operating in accordance the exemplary embodiment, however, transmits the signal in the fifth time slot 505 at the authorized power level 510.

Figure 6:
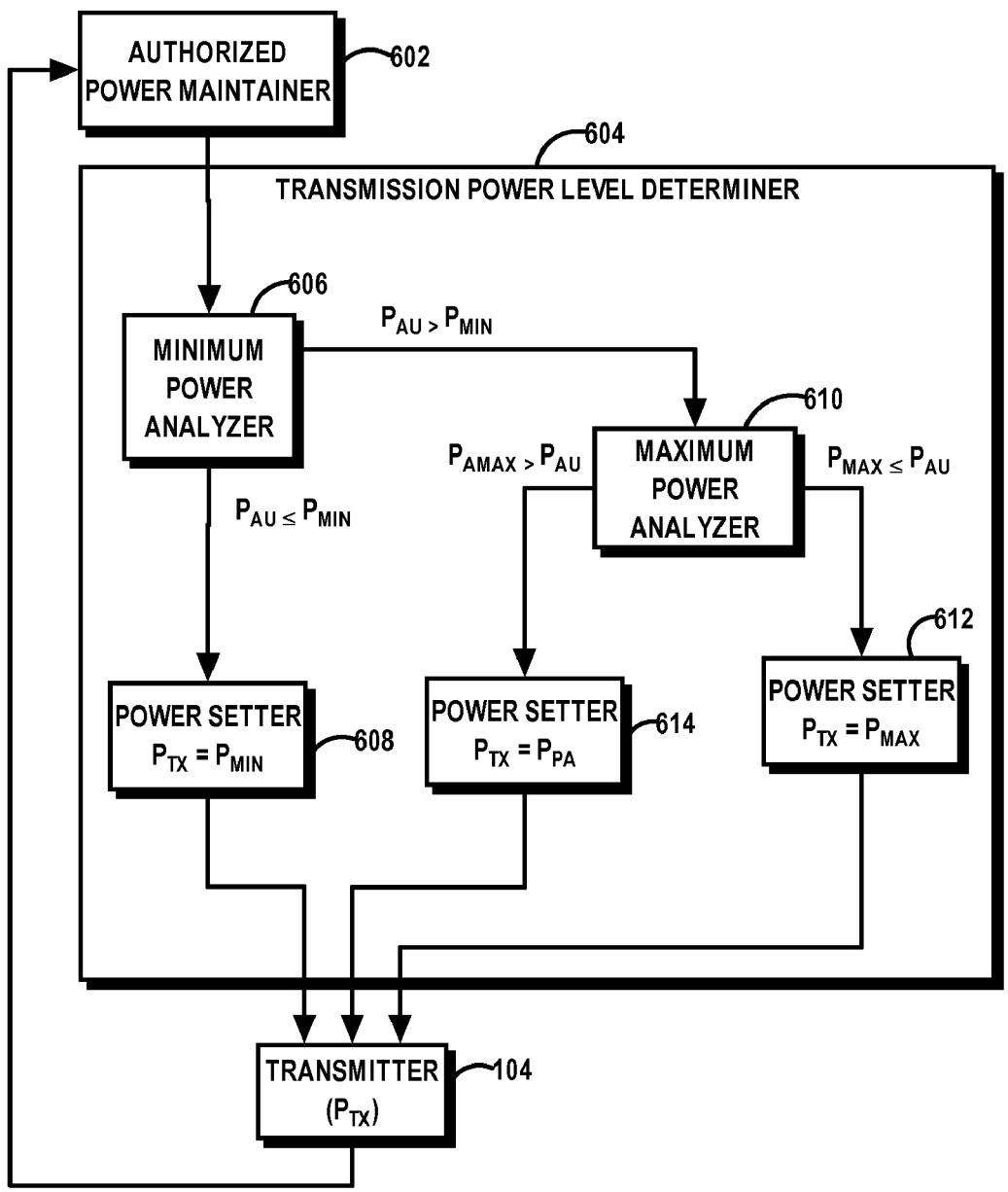
FIG. 6 is a block diagram of a system for managing power control in accordance with the exemplary embodiment of the invention.

FIG. 6 is a block diagram of a system for managing power control in accordance with the exemplary embodiment of the invention. The various blocks shown in FIG. 6 represent functions that can be implemented in any combination of software, hardware, and/or firmware. Any function described as performed by a single block may be performed by multiple devices or systems and the functions of more than one block may be performed by a single device in some circumstances. An example of a suitable implementation of the functional blocks includes executing software code on the controller 108.

The authorized power maintainer 602 maintains the authorized power level. The controller 108 interprets power control commands transmitted by the node B 102 and received through the receiver 106 to adjust the authorized power level. In the exemplary embodiment, TPC commands in accordance with the UMTS standard are received by the receiver 106 and indicate if the authorized power should be increased or decreased. A value representing the authorized power level is stored in memory and updated as necessary. The authorized power maintainer 602, therefore, monitors and adjusts the authorized power level based on the power control commands. An exemplary method of performing step 202 is discussed in further detail with reference to FIG. 3 below.

The transmission power level determiner 604 determines the transmission power level for a signal based on the authorized power level. The transmission power level determiner 604 includes the minimum power analyzer 606, the maximum power analyzer 610, and three power setters 608, 612, 614.

The transmitter 104 transmits a signal from the UE device 100 at a transmission power (PTX). In the exemplary embodiment, the transmission power (PTX) is determined based on the transmission data rate and the number of channels in accordance with a transmission scheme as well as the criteria used by blocks 606-614. In the exemplary embodiment, therefore, power management method applies the authorized power level to transmit a non-limited signal after a power limited signal is transmitted and before a new power control command is received. After the signal is transmitted, the maintainer 602 continues to maintain the authorized power level.

The minimum power analyzer 606, analyzes the minimum power (PMIN) to determine if the authorized power level is less than or equal to the minimum power level (PMIN) of the UE device 100. If the authorized power is less than or equal to the minimum power level (PMIN), the transmission power (PTX) is set equal to the minimum power by the power setter 608. Otherwise, the maximum power analyzer 610 determines if the maximum power is less than or equal to the authorized power level (PAU). If the maximum power is less than or equal to the authorized power level, the transmission power level is set equal to the maximum power level by the power setter 612. Otherwise, the transmission power is set equal to the authorized power at by the power setter 614.

Figure 7:
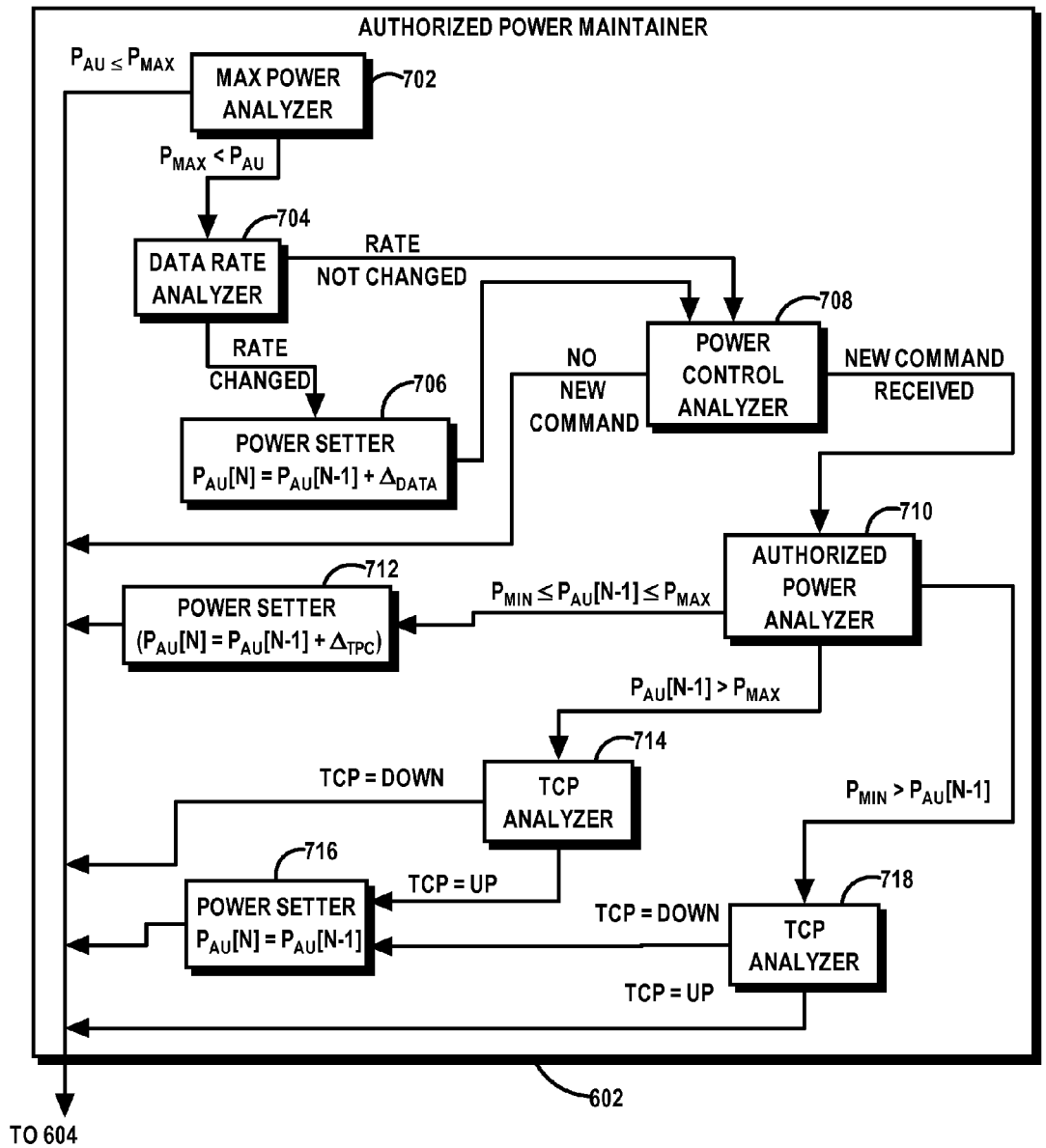
FIG. 7 is a block diagram of an exemplary functional implementation of the authorized power maintainer.

FIG. 7 is a block diagram of an exemplary functional implementation of the authorized power maintainer 602. The various blocks shown in FIG. 7 represent functions that can be implemented in any combination of software, hardware, and/or firmware. Any function described as performed by a single block may be performed by multiple devices or systems and the functions of more than one block may be performed by a single device in some circumstances. An example of a suitable implementation of the functional blocks includes executing software code on the controller 108.

The maximum power analyzer 702 determines whether the maximum power level is less than the authorized power level. If the maximum power level is not less than the authorized power level, power level determiner 604 determines the transmission power level. Otherwise, the data rate analyzer 704 determines whether a data rate change or a channel change has occurred since the last transmission. If a change has occurred, the power setter 706 sets the current authorized power level (PAU[N]) based on the previous authorized power level (PAU[N−1]) and the power level change associated with the rate change or data change.

The power control analyzer determines whether new power control information has been received since the last transmission. If no new power control information has been received, the transmission power level determiner 604 determines the transmission power level.

In no new power control command has been received, the authorized power analyzer 710 determines whether the previous authorized power level is between the maximum and minimum limits (PMIN≦PAU[N−1]≦PMAX). If the previous authorized power limit is between the power limits, the power setter 712 sets the authorized power level based on the power control commands.

If the previous power level is greater than the maximum power level the TCP analyzer 714 determines if the power control command is equal to "UP". If the previous authorized power level is less than the minimum authorized power, the TCP analyzer 718 determines if the TCP is equal to "DOWN".

If the previous power level is greater than the maximum power level and the TCP is equal to "UP" or if the previous authorized power level is less than the minimum authorized power and the TPC command is equal to "DOWN", the power setter 716 sets the current authorized power level to the previous authorized power level.

Therefore, in the exemplary embodiment, the UE device 100 maintains an authorized power level by monitoring and adjusting the authorized power level based on TPC commands received through the receiver 106. After a power limited state where a signal is transmitted at a power less then the authorized power, the UE device 100 transmits the next signal at the authorized power if the authorized power is less than or equal to the maximum power.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method of managing transmission power in a user equipment device, the method comprising:
    maintaining a power control adjustment state for an uplink transmission based on received transmitter power control (TPC) commands; and
    determining, after an uplink power limited transmission at a power level less than the power control adjustment state subsequent to the uplink transmission and before a new TPC has been received, a transmission power level for a yet subsequent non-power limited uplink transmission of a signal based on the power control adjustment state.

2. The method in accordance with claim 1, wherein the uplink power limited transmission comprises:
    a signal transmission at a maximum power level of the user equipment device, the maximum power level less than a previous power control adjustment state.

3. The method in accordance with claim 2, further comprising:
    transmitting a power limited signal at a maximum power level when the maximum power level is less than the power control adjustment state; and
    transmitting a non-limited signal at the power control adjustment state when the power control adjustment state is less than the maximum power level and before the new TPC is received.

4. The method in accordance claim 3, wherein transmitting the power limited signal comprises:
    setting channel transmission power levels of a plurality of channels to reduce a total transmission power from a total authorized power for the plurality of channels to the maximum power level.

5. The method in accordance with claim 3, wherein transmitting the power limited signal comprises:
    setting a total transmission power level to reduce a total authorized transmission power for a first data rate to the maximum power level.

6. The method in accordance with claim 3, wherein the power control adjustment state is based on a first data rate of the power limited signal and the non-limited signal has a second data rate less than the first data rate.

7. The method in accordance with claim 1, wherein the maintaining comprises:
    adjusting the power control adjustment state based on a change in transmission data rate.

8. The method in accordance with claim 1, wherein the maintaining comprises:
    adjusting the power control adjustment state based on a TPC if the power control adjustment state is less than a maximum power level.

9. The method in accordance with claim 8, wherein the maximum power level is determined by selecting a minimum of the user equipment category and a network signaled value.

10. A user equipment device configured to communicate in a wireless communication system, the user equipment device comprising:
    a receiver configured to receive transmitter power control TPC commands;

a controller configured to maintain a power control adjustment state for an uplink transmission related to a transmission data rate and based on the TPC commands, the controller further configured to determine, after an uplink power limited transmission at a power level less than the power control adjustment state subsequent to the uplink transmission and before a new TPC command has been received, a transmission power level for a yet subsequent non-power limited uplink transmission of a signal based on the power control adjustment state.

11. The user equipment device in accordance with claim 10, wherein the uplink power limited transmission comprises:
a signal transmission at a maximum power level of the user equipment device, the maximum power level less than a previous power control adjustment state.

12. The user equipment device in accordance with claim 11, further comprising:
a transmitter configured to transmit a power limited signal at the maximum power level when the maximum power level is less than the power control adjustment state and configured to transmit a non-limited signal at the power control adjustment state when the power control adjustment state is less than the maximum power level and before the new TPC command is received.

13. The user equipment device in accordance claim 12, wherein transmitter is further configured to transmit the power limited signal by setting channel transmission power levels of a plurality of channels to reduce a total transmission power from a total authorized power for the plurality of channels to the maximum power level.

14. The user equipment device in accordance with claim 12, wherein the transmitter is further configured to transmit the power limited signal by setting a total transmission power level to reduce a total authorized transmission power for a first data rate to the maximum power level.

15. The user equipment device in accordance with claim 12, wherein the power control adjustment state is based on a first data rate of the power limited signal and a non-limited signal has a second data rate less than the first data rate.

16. The user equipment device in accordance with claim 10, wherein the controller is further configured to maintain the power control adjustment state by adjusting the power control adjustment state based on a change in transmission data rate.

17. The user equipment device in accordance with claim 10, wherein the controller is further configured to maintain the power control adjustment state by adjusting the power control adjustment state based on a TPC command if the power control adjustment state is less than a maximum power level.

18. The user equipment device in accordance with claim 17, wherein the maximum power level is determined by selecting a minimum of the user equipment category and a network signaled value.

19. A wireless communication system comprising:
a node B transmitting transmitter power control (TPC) commands; and
a user equipment (UE) device receiving the TPC commands and maintaining a power control adjustment state based on the TPC commands, the UE device comprising:
a receiver configured to receive the TPC commands; and
a controller configured to maintain the power control adjustment state for an uplink transmission related to a transmission data rate and based on the TPC commands, the controller further configured to determine, after an uplink power limited transmission at a power level less than the power control adjustment state subsequent to the uplink transmission by the UE device and before a new TPC command has been received, a transmission power level for a yet subsequent non-power limited uplink transmission of a signal based on the power control adjustment state.

20. The wireless communication system in accordance with claim 19, the UE device further comprising:
a transmitter configured to transmit a power limited signal at a maximum power level when the maximum power level is less than the power control adjustment state and to transmit a non-limited signal at the power control adjustment state when the power control adjustment state is less than a maximum power level and before the new TPC command is received.

21. A computer program product including a computer-readable medium including computer-executable instructions encoded thereon for executing a method for managing transmission power in a user equipment device, the computer-executable instructions configured for causing the following computer-executed steps to occur:
maintaining a power control adjustment state for an uplink transmission based on received transmitter power control (TPC) commands; and
determining, after an uplink power limited transmission at a power level less than the power control adjustment state subsequent to the uplink transmission and before a new TPC command has been received, a transmission power level for a yet subsequent non-power limited uplink transmission of a signal based on the power control adjustment state.

22. The program product in accordance with claim 21, wherein the uplink power limited transmission comprises:
a signal transmission at a maximum power level of the user equipment device, the maximum power level less than a previous power control adjustment state.

23. The program product in accordance with claim 22, the computer-executable instructions further configured to cause the following steps to occur:
transmitting a power limited signal at a maximum power level when the maximum power level is less than the power control adjustment state; and
transmitting a non-limited signal at the power control adjustment state when the power control adjustment state is less than the maximum power level and before the new TPC command is received.

24. The program product in accordance claim 23, wherein transmitting the power limited signal comprises:
setting channel transmission power levels of a plurality of channels to reduce a total transmission power from a total authorized power for the plurality of channels to the maximum power level.

25. The program product in accordance with claim 23, wherein transmitting the power limited signals comprises:
setting a total transmission power level to reduce a total authorized transmission power for a first data rate to the maximum power level.

26. The program product in accordance with claim 23, wherein the power control adjustment state is based on a first data rate of the power limited signal and the non-limited signal has a second data rate less than the first data rate.

27. The program product in accordance with claim 21, wherein the maintaining comprises:
adjusting the power control adjustment state based on a change in transmission data rate.

28. The program product in accordance with claim 21, wherein the maintaining comprises:

adjusting the power control adjustment state based on a TPC command if the power control adjustment state is less than a maximum power level.

29. A user equipment device configured to communicate in a wireless communication system, the user equipment device comprising:
- a maintaining means for maintaining a power control adjustment state for an uplink transmission based on received transmitter power control (TPC) commands; and
- a determining means for determining, after an uplink power limited transmission at a power level less than the power control adjustment state subsequent to the uplink transmission and before a new TPC command has been received a transmission power level for a yet subsequent non-power limited uplink transmission of a signal based on the power control adjustment state.

30. The user equipment device in accordance with claim 29, wherein the uplink power limited transmission comprises:
- a signal transmission at a maximum power level of the user equipment device, the maximum power level less than a previous power control adjustment state.

31. The user equipment device in accordance with claim 30, further comprising:
- a transmitting means for transmitting a power limited signal at a maximum power level when the maximum power level is less than the power control adjustment state; and
- the transmitting means for transmitting a non-limited signal at the power control adjustment state when the power control adjustment state is less than the maximum power level and before the new TPC command is received.

32. The user equipment device in accordance with claim 31, wherein transmitting means comprises:
- a setting means for setting channel transmission power levels of a plurality of channels to reduce a total transmission power from a total authorized power for the plurality of channels to the maximum power level.

33. The user equipment device in accordance with claim 31, the setting means for setting a total transmission power level to reduce a total authorized transmission power for a first data rate to the maximum power level.

34. The user equipment device in accordance with claim 31, wherein the power control adjustment state is based on a first data rate of the power limited signal and the non-limited signal has a second data rate less than the first data rate.

35. The user equipment device in accordance with claim 29, wherein the maintaining means comprises:
- an adjusting means for adjusting the power control adjustment state based on a change in transmission data rate.

36. The user equipment device in accordance with claim 29, wherein the maintaining means comprises:
- an adjusting means for adjusting the power control adjustment state based on a TPC command if the power control adjustment state is less than a maximum power level.

* * * * *